Jan. 9, 1968 R. PROCHNOW 3,363,066
VIDEO TAPE RECORDER WITH ADJUSTABLE HEAD
ASSEMBLY AND TAPE GUIDE
Original Filed Sept. 12, 1960 5 Sheets-Sheet 1

Inventor:
Rudolf Prochnow
By
Michael J. Striker
Attorney

Inventor:
Rudolf Prochnow
By
Michael J. Striker
Attorney

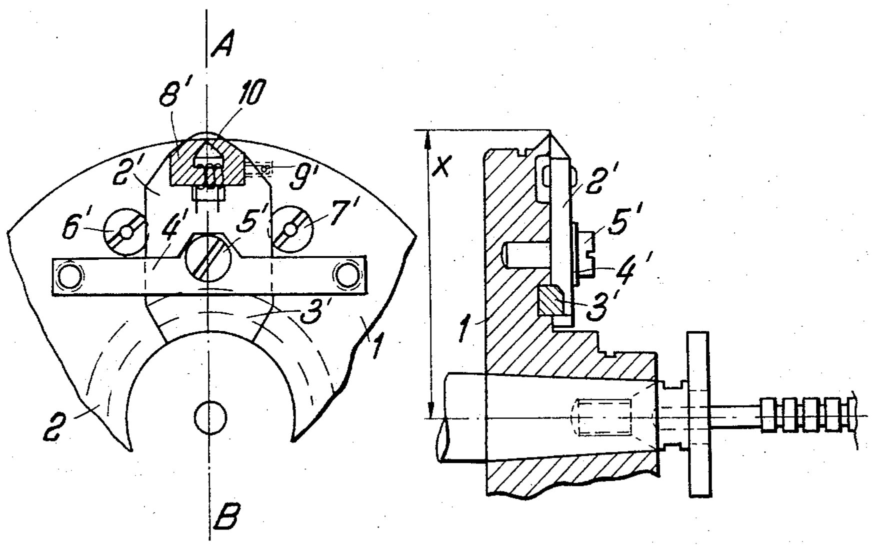
Fig. 4 Fig. 5
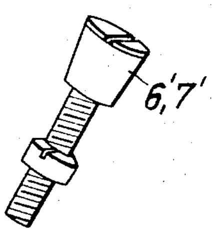
Fig. 4a
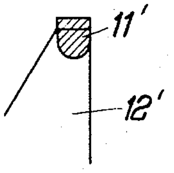
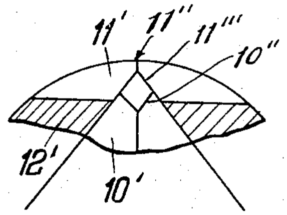
Fig. 6 Fig. 6a
Inventor:
Rudolf Prochnow
By
Michael J. Striker
Attorney Inventor:
Rudolf Prochnow
By
Michael S. Striker
Attorney Inventor:
Rudolf Prochnow
By
Michael S. Striker
Attorney United States Patent Office 3,363,066

Patented Jan. 9, 1968

3,363,066

VIDEO TAPE RECORDER WITH ADJUSTABLE HEAD ASSEMBLY AND TAPE GUIDE

Rudolf Prochnow, Darmstadt-Eberstadt, Germany, assignor to Fernseh G.m.b.H., Darmstadt, Germany Original application Sept. 12, 1960, Ser. No. 55,411, now Patent No. 3,227,815, dated Jan. 4, 1966. Divided and this application Feb. 27, 1964, Ser. No. 347,833

Claims priority, application Germany, Sept. 11, 1959, F 29,359

9 Claims. (Cl. 179—100.2)

ABSTRACT OF THE DISCLOSURE

A recorder for magnetically recording video signals on a magnetizable tape in which a rotary wheel carrying a plurality of electromagnetic heads at uniform radial distance from the wheel axis is supported on a base so that the vertical distance of the wheel axis may be adjusted relative to the base, and in which a tape guide having a concave arcuate portion for guiding a tape in cupped condition along a portion of the circular path described by the heads during rotation of the wheel is mounted on the base adjustable in a direction substantially normal to the axis of the wheel so that the tape guide may be moved between an idle position in which the concave guide portion is spaced from the circular path of the head sufficiently to permit the tape to assume an uncupped condition, and an operating position in which the tape is guided in cupped condition along the aforementioned circular path, and so that the position of the wheel axis and the arcuate portion of the tape guide may be adjusted relative to each other to maintain in the operating position the arcuate portion of the tape guide exactly concentric with the wheel axis.

The invention concerns video tape recorders with several magnetic heads arranged about the circumference of a rotary wheel so that the circular paths of said heads traverse the magnetic tape approximately transverse to its longitudinal direction, the magnetic tape being guided in cupper condition along a part of the circular paths of said heads.

This is a division of my copending application Ser. No. 55,411, filed Sept. 12, 1960 now Patent No. 3,227,815 and titled "Head Wheel Panel for Video Tape Recorders."

The invention results in improvements which make possible the attainment and maintenance of the necessary high accuracy, and also facilitate the production and alignment of the head carrying wheel. The invention also concerns measures for an unhindered tape rewind, as well as an improved form of the magnetic heads, especially of their pole shoes, and slip-ring arrangements for establishing circuits for the head currents.

In order to produce the high relative velocity between tape and head necessary for the recording or pickup of television signals on or from magnetic tape, respectively, it is already known to move the magnetic heads in a direction transverse of the longitudinal direction of the tape and to arrange them on the circumference of a head wheel which rotates at an appropriately high number of revolutions. The magnetic tape is then kept in cupped form by a concave guide arranged concentric with and along a part of the circumference of the head wheel. For continuous recording on the resulting transverse tracks several heads are therefore necessary, which are arranged at equal angular spacing about the circumference of the head wheel. Such an arrangement should meet very high standards of accuracy. The magnetic gaps of the various heads should lie exactly on one circumferential line of the head wheel, have equal distances in the radial direction from the axis of the head wheel and the angular spacing, e.g., 90° for four heads, must likewise be provided for with great accuracy. According to a known proposal the magnetic members of the heads are made mainly of ferrite, while the poles thereof are provided with pole shoes of an iron-aluminium alloy. The pole shoes have very small dimensions to match the track width of e.g. 0.25 mm. and have a thickness of e.g. 0.1 mm. Thus positioning these pole shoes is very difficult. In the known construction the magnetic heads are arranged in mountings which in turn are secured to the head wheel. In order that the heads may cooperate uniformly with the magnetic tape the latter is forced into a transversely cupped condition by a concave guide so that the radius of curvature of the cupped tape corresponds to the maximum radius of the wheel. In a known embodiment the tape is urged and held against a concave guide by air pressure, in that a vacuum is maintained along the surface of the guide. In order that the magnetic heads engage the tape uniformly during operation it is not only necessary that the outer radius of the head wheel and the radius of curvature of the guide agree with one another, but care must also be taken that the centre of curvature of the concave guide lies on the axis of rotation of the head wheel and that the guide is held by an appropriate means at an exactly maintained uniform distance from the path of the head tips. On the other hand it is necessary to withdraw the guide from the head wheel during threading of the tape and during the tape rewind. In a known arrangement the guide is carried for this purpose by a lever which is pivotable about an axis perpendicular to the axis of the head wheel. In this form of construction the guide is withdrawn only slightly (by about 2 mm.) from the head wheel. The tape therefore retains even during the rapid rewind the curvature enforced by the air pressure. In another known arrangement the guide moves about a relatively short pivot parallel to the head wheel axis. Therefore this construction does not possess the necessary accessibility and accuracy.

In general, it is an object of the present invention to provide improved video tape recorders of outstanding quality, special consideration being given to the demand that all members, which contribute to friction between the head tips and the tape, be so designed that a predetermined distance in radial direction between heads and guide is established and maintained with the necessary accuracy.

Another object is an improved arrangement of the guide member for the tape.

Additional objects of the invention will appear from the following description in conjunction with the accompanying drawing.

Referring to the drawings.

Figures 3, 3A:
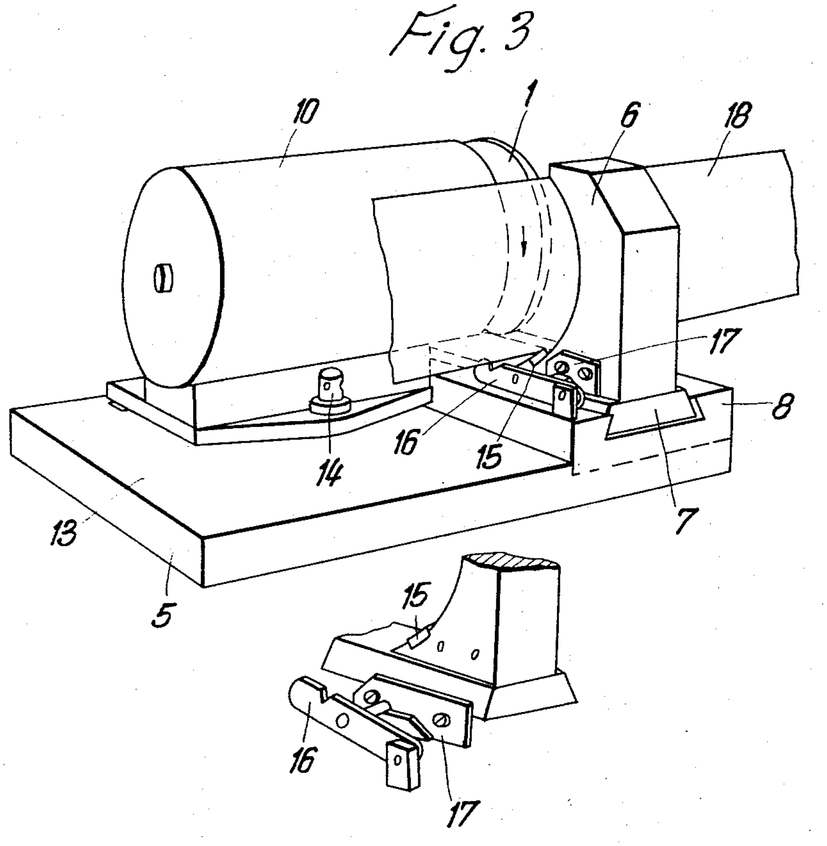
FIGURE 3 is a different view of the head wheel assembly of FIG. 1 illustrating improved details of the tape guide.

FIGURE 3*a* shows similarly in an exploded view member details of FIGURE 3.

FIGURE 4 shows a portion of the head wheel with a magnetic head emphasized by hatching and its mounting in a view taken in direction of the axis.

FIGURE 4*a* shows a screw member of FIGURE 6.

FIGURE 5 is a sectional elevation, the section being taken along line A–B of FIGURE 4.

FIGURES 6 and 6*a* are enlarged illustrations in end and front view, respectively, of a head tip with the pole pieces constructed in accordance with the invention.

Figure 7:
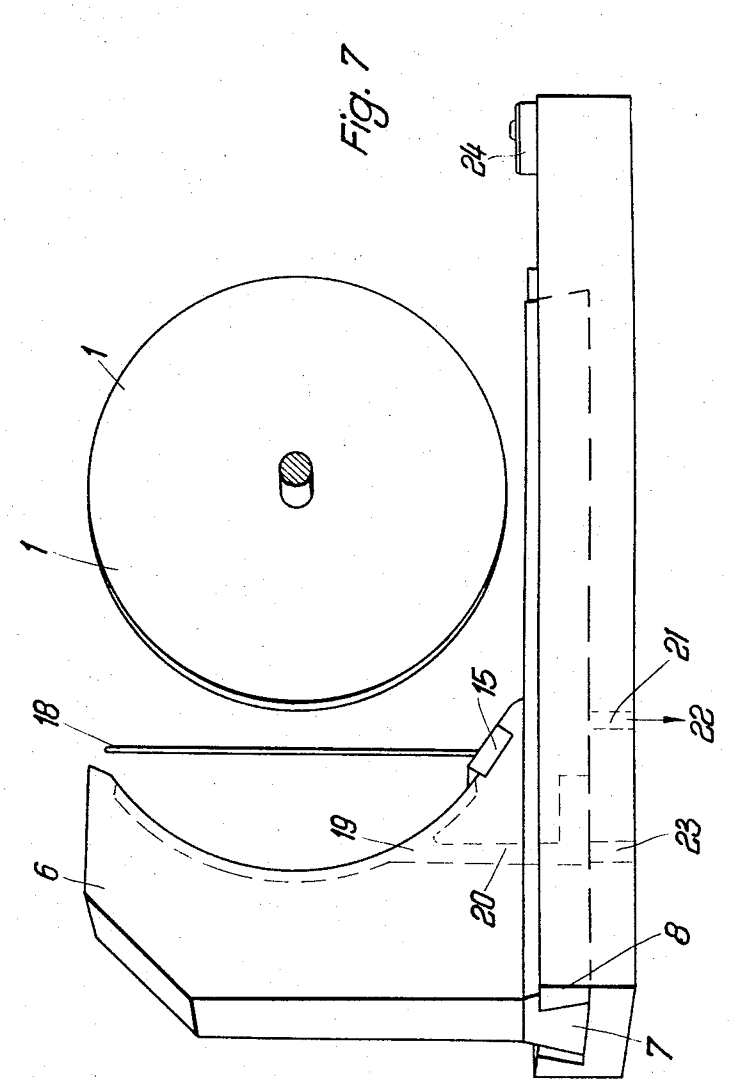

FIGURE 7 is a schematic illustration of the arrangement showing the mounting of the guide in accordance with the invention.

Figure 8B:
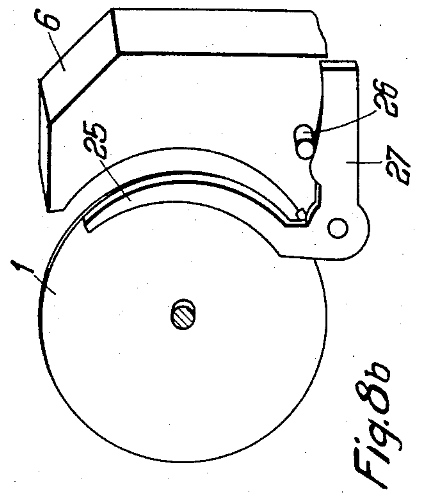
Figure 8D:
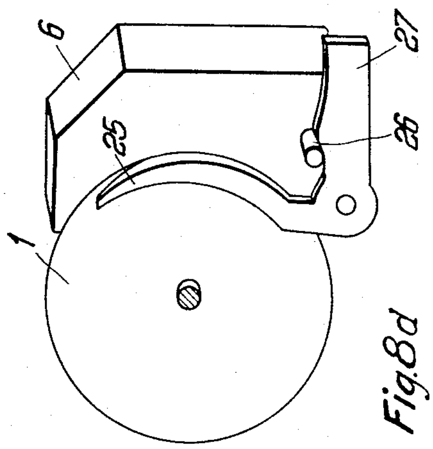
Figure 8A:
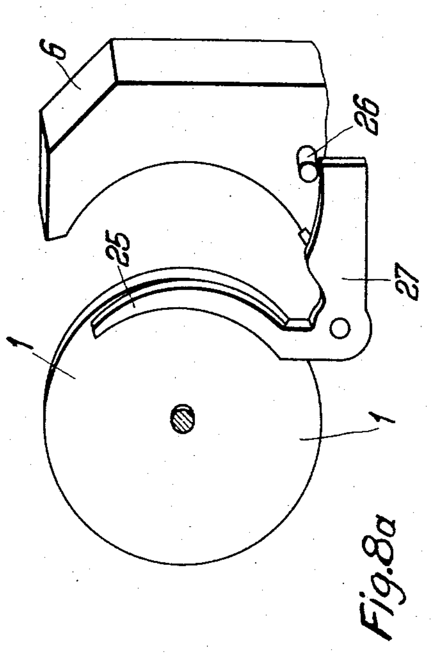

FIGURES 8*a, b, c* and *d* show schematically a modification of the tape guide in various operational positions.

Figures 1, 2:
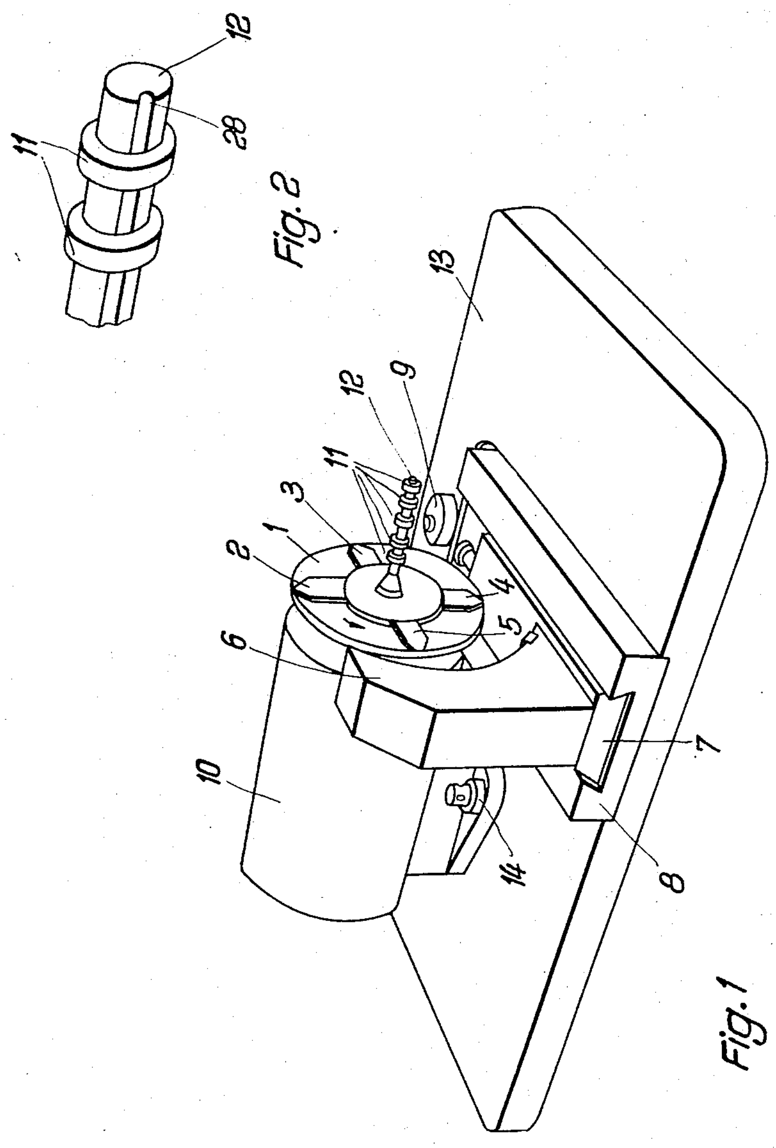
FIGURE 1 shows a general view of a head wheel assembly according to the invention.
FIGURE 2 is an enlarged illustration of a detail of FIGURE 1, namely of the shaft carrying the slip-rings.

In FIGURE 1, 1 indicates the head wheel, which consists of non-magnetic material, e.g. brass. Around the circumference of the head wheel 1, the magnetic heads 2, 3, 4, 5 are mounted in the manner described further below.

The concave guide 6 for the magnetic tape is secured according to the invention to a slide 7 which is movable parallel with itself and in a direction perpendicular to the axis of the head wheel 1. This arrangement ensures the concave guide 6 to be positioned in the working position rigidly and free of play and on the other hand makes it possible without injuriously affecting the accuracy to provide for a distance between head wheel 1 and guide 6 so great that during the rewind the tape no longer needs to be bent into cupped condition by the guide, but runs in flat shape freely between head wheel and guide.

The centre of curvature of the concave guide 6 should coincide exactly with the axis of the head wheel 1. In order that this condition be fulfilled even upon exchange of the head wheel, a possibility of adjusting the relative positions of centre of curvature and head wheel axis should be provided. Since in the form of construction described the guide 8 for the movable slide member 7 supporting concave guide 6 is rigidly connected with the baseplate 13 of the head wheel assembly, the necessary alignment is effected by adjusting the height of the head wheel axis. For this purpose the head wheel 1 is secured, together with the associated driving motor 10, to a plate which is hinged at one end to the base 13 and the free end of which may be raised or lowered by means of a fine adjustment screw 14.

The slip-rings 11 serving for the feeding or delivering the head currents are disposed on a thin, freely projecting shaft 12 of insulating material and of small diameter. In order to avoid an undesired distortion of this shaft which rotates at a high number of revolutions it has been found advisable to make the shaft of ceramic material. The lead wires to the slip-rings can be placed in slots (28 in FIGURE 2), which are ground in the ceramic shaft.

FIGURE 3 shows another view of the head wheel assembly. In the area where the heads during rotation in direction of the arrow leave the tape 18 the concave guide 6 is provided with a guide-bar 15, with a guiding surface or edge extending in the direction of movement of the tape, so that the lower edge of the tape is urged against this guide surface under the influence of the frictional engagement of the heads with the tape. In order to ensure a trouble-free guiding engagement of the guide-bar edge with the lower edge of the tape when guide member 6 is moved into position a lever 16 may be provided which is lifted when the concave guide carrying the cam plate 17 is moved and which engages with a notch 16' the tape edge and lifts the tape onto guide-bar 15.

In FIGURES 4 and 5, 1 indicates a portion of the head wheel. The magnetic heads spaced from each other along the circumference of the head wheel, one only of which is illustrated in FIGURE 4, are received each by a holder 2' of non-magnetic material, e.g. brass. The holder 2' is provided near its inner end with a turned arcuate groove with which it engages a ring 3' from one side. On the other side the ring 3' is firmly inserted in an annular turned groove 2'' in the head wheel 1. The holder 2' is urged by a clamping strip 4' against the surface of the head wheel 1 and fixed by a clamping screw 5'. After loosening the clamping screw 5' the relative angular spacing of the heads may be adjusted with high accuracy by means of two screws with conical heads 6' and 7' (FIGURE 4*a*) e.g. by loosening the one and tightening the other. The outer surface of the ring 3' is bevelled, so that the holder 2' engages only with one edge of its groove the surface of the ring 3' which is closer to the axis. The advantage is thus obtained that in the process of setting the heads to the prescribed angular spacing the gaps of the individual heads are kept at the same radial distance from the axis.

In the holders 2' the distance from the groove edge engaging the ring 3' to the head tips is the reference distance to which each head with its holder is adjusted or held during manufacture. If the mounting surface for the magnetic head on the holder 2' is machined in a jig which is provided with a concentric guide member equal to ring 3' engaging the groove in the holder 2', then it is possible to obtain an exact radial position of the gap at the tip of the head, which is still maintained correct during angular adjustment of the heads.

The manufacture and machining of the magnetic heads is commenced from the turned arcuate groove at the lower end of the holder 2'. The holder is positioned with the help of the ring 3' or an equivalent in the steps of machining and mounting by which the heads are built up and machined. For this purpose a reference surface for the holder 2' e.g. 8', is first machined with great accuracy parallel to the axis. The halves of the magnetic core bearing against this reference surface are so machined and adjusted that the tip of the head, taking into account the pole pieces and the addition for subsequent machining, is so located that this location corresponds to the ultimate distance *x* from the axis. The machined halves of the head are placed into the holder 2'. The desired distance between the two head halves, which forms the head gap, is predetermined by producing by evaporation of silicon oxide a layer thereof on the gap surfaces. The two head halves prepared in the manner described are pressed one aganist the other. This can be effected by means of a screw 9'; the bifurcated magnetic head holder 2' may also be made resilient, so that the halves of the head are secured between the surfaces of the fork by elastic clamping.

After the assembly of the head and the relative adjustment of the halves of the head, the head tips are machined in a jig which again is equipped with a locating ring equivalent to ring 3'. The outer surface of the head is first roughly ground and finally finely lapped to the exact distance *x*.

If the heads machined in this manner and assembled with their holders 2' are mounted on the head wheel 1 with the help of the locating ring 3' the described construction and process of manufacture ensures that in the heads mounted on the head wheel the gaps also are oriented exactly radially and that the distance of the polished surfaces of the heads from the axis is maintained with the necessary high accuracy and is not altered and does not alter even during the adjustment of the angular spacing of the heads by means of the conical head screws 6' and 7'.

The construction of the head tips in accordance with the invention may be seen from FIGURES 6 and 6*a*. The supporting surface of the pole pieces 11' has a semicircular cross-section, corresponding to a half-round groove of the magnetic core 12' as can be seen from FIGURE 6. Thus after attaching the pole pieces 11' to the core members 12' their correct position is ensured; in addition hereby the size of the contact surfaces between the halves of the magnetic core 12' and the pole pieces 11' is increased and thus a more secure mounting of the polepieces, preferably secured by adhesive, is obtained. To protect the tips of the halves 12' of the magnetic core against deformation and to make possible a perfectly flat grinding of the gap surfaces, spacing pieces 10' of ceramic material may be placed between the core halves 12' (FIGURE 6*a*). The distance between the polepieces 11', which constitutes the head gap, is maintained by a thin layer 11' of 1–2$\mu$ thickness of silicon oxide, which fills the head gap and thus prevents clogging of the gap by iron oxide particles abraded from the tape.

In order as far as possible to concentrate the magnetic flux in the head tips and thus to obtain effective cooperation with the tape, it is advisable to widen the gap by tapering it at 11''' very close to the point of contact with the tape, the ceramic filling pieces 10' also having a corresponding taper 10''. The gap depth is kept only as large as corresponds to the permissible wear, e.g. 0.1 mm.

In FIGURE 7, 1 is the head wheel is schematic illustration, and the concave guide 6, in its working position, gives to the tape 18 a cupped condition matching the circular path of the head tips. In the FIGURE 7 the guide 6 is shown in its position remote from the head wheel 1. In accordance with the invention the concave guide 6 is secured to a slide member 7, which can be shifted together with the guide 6 in an appropriate guide block 8 parallel to itself and in a direction perpendicular to the head wheel axis. In this manner the stroke of the movement of guide 6 can without difficulty be made so large without deleteriously affecting the accuracy of the working position of the concave guide 6 that during rewind when guide 6 is in the illustrated remote position the tape 18 can move freely in flat condition as indicated in FIGURE 7 between the head wheel 1 and the concave guide 6, and there is no necessity to bend the tape by means of the concave guide also during the rewind with the risk of abrading and retarding it.

The described construction of the concave guide 6 yields the further advantage that the connection and control for the application of suction to the tape can be effected without movable connections. The vacuum in the vacuum space 19 of the concave guide 6 is produced by pumping through the channel 20, which in the working position of guide 6 communicates with the bore 22 in the guide block 8 and thus connects the vacuum space 19 with the vacuum connection 22.

In the inoperative or remote position of the concave guide 6 the channel 20 registers with another opening 23 in the guide block 8 and in connection with the external air, so that the external air can enter into the vacuum space 19 and release the magnetic tape 18. The movement of the concave guide 6 may in known manner be effected by an electro-magnet (not shown), which in accordance with the requirements of operation moves the concave guide 6 toward the head wheel 1 or removes it from the latter. The fine adjustment of the distance between the guide 6 and the circular path of the head tips is effected by means of an eccentric 24 acting as a stop in the working position of guide 6, preferably by means of a remote controlled or automatic servomechanism.

As shown in FIGURES 8*a, b, c, d* an additional convex guide 25 may be provided, which moves relative to the wheel 1 in opposite direction to the movement of the concave guide 6 and has the effect that as the guide 6 approaches the head wheel 1 the magnetic tape is already given approximately the correct curvature, so that it is already urged into the guide 6 and held by motion therein, before the head wheel, or rather the head tips, rub against the tape.

Figure 8C:
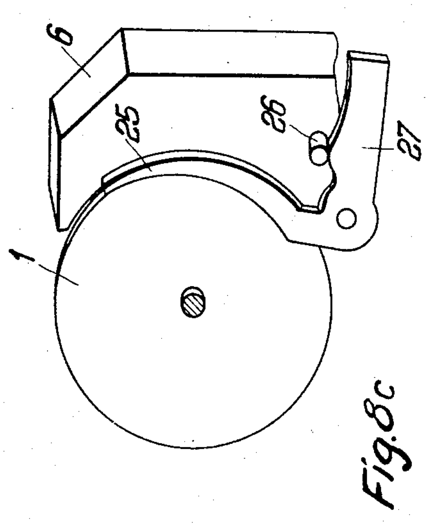

The movement of the convex guide 25 can be derived from the movement of concave guide 6. For this purpose a pin 26 is mounted on the guide 6 as shown, sliding on a cam portion 27 of the convex guide 25. The cam edge has such a curvature, that the tape is pressed by the convex edge of guide 25 against the concave guide 6 only when the guide 6 is near its working position. In the FIGURES 8*a* to 8*d* four phases of the movement are shown. In FIGURE 8*a* the guide 6 has the greatest distance from the head wheel 1, so that the tape can pass freely between the head wheel 1 and the guide 6 as shown in FIGURE 7. When moving the guide 6 (FIGURE 8*b*) in the direction toward the head wheel 1, the guide 25 is tilted so that the tape will be engaged by the guide 25 before contacting the head wheel. In consequence of the resulting transverse curvature the tape will be sucked into the corresponding curvature of the concave guide 6 (FIGURE 8*c*). The guide 25 is finally retracted again from the tape, when the working position of guide 6, corresponding to FIGURE 8*d*, is reached. Thus the entire width of the tape is brought at the same time in contact with the heads carried by the rotating wheel and an inconvenient wear in the centre region of the tape is avoided.

What is claimed as new and desired to be secured by Letters Patent is:

1. In a recorder for magnetically recording video signals on a magnetizable tape, in combination, a base having a reference surface; an electromagnetic head assembly comprising a rotary wheel member and a plurality of electromagnetic head means mounted on said wheel member at uniform radial distance from the axis of rotation of said wheel member and adjustable in circumferential direction to uniform angular spacing between said head means; support means for rotatably supporting said wheel member, said support means being mounted on said base movably in a direction of adjustment substantially perpendicular to said reference surface and to said axis of rotation; first adjusting means for adjusting the position of said support means and thereby the distance of said axis of rotation from said reference surface; tape guiding means for guiding the magnetizable tape in cupped condition along a portion of the circular path of said head means and in a direction transverse of the plane of rotation thereof, said tape guiding means having a concave arcuate guide portion for guiding the tape in said cupped condition and being mounted on said base for being movable relative thereto in a direction transverse of said axis of rotation and transverse of said direction of adjustment of said support means, between an idle position in which said concave guide portion is spaced from said head assembly sufficiently to permit said tape to assume an uncupped condition, and an operating position in which said tape is guided in cupped condition along said circular path of said head means; and second adjusting means for predetermining said operating position of said tape guiding means, whereby through the combined effect of said first and second adjusting means said concave guide portion is adjustable to be concentric with said axis of rotation when said tape guide means are in operating position.

2. In a recorder for magnetically recording video signals on a magnetizable tape, in combination, a base having a reference surface; an electromagnetic head assembly comprising a rotary wheel member and a plurality of electromagnetic head means mounted on said wheel member at uniform radial distance from the axis of rotation of said wheel member; support means for rotatably supporting said wheel member, said support means being mounted on said base movably in a direction of adjustment substantially perpendicular to said reference surface and to said axis of rotation; first adjusting means for adjusting the position of said support means and thereby the distance of said axis of rotation from said reference surface; tape guiding means for guiding the magnetizable tape in cupped condition along a portion of the circular path of said head means and in a direction transverse of the plane of rotation thereof, said tape guiding means having a concave arcuate guide portion for guiding the tape in said cupped condition and being mounted on said base for being movable relative thereto in a direction transverse of said axis of rotation and transverse of said direction of adjustment of said support means, between an idle position in which said concave guide portion is spaced from said head assembly sufficiently to permit said tape to assume an uncupped condition, and an operating position in which said tape is guided in cupped condition along said circular path of said head means; and second adjusting means for predetermining said operating position of said tape guiding means, whereby through the combined effect of said first and second adjusting means said concave guide portion is adjustable to be concentric with said axis of rotation when said tape guide means are in operating position.

3. In a recorder for magnetically recording video signals on a magnetizable tape, in combination, a base having a reference surface; an electromagnetic head assembly comprising a rotary wheel member and a plurality of electromagnetic head means mounted on said wheel member at uniform radial distance from the axis of rotation of said wheel member; support means for rotatably supporting said wheel member, said support means being mounted on said base movably in a direction of adjustment substantially perpendicular to said reference surface and to said axis of rotation; first adjusting means for adjusting the position of said support means and thereby the distance of said axis of rotation from said reference surface; tape guiding means for guiding the magnetizable tape in cupped condition along a portion of the circular path of said head means and in a direction transverse of the plane of rotation thereof, said tape guiding means having a concave arcuate guide portion for guiding the tape in said cupped condition and being mounted on said base for being slidable along said base in a direction transverse of said axis of rotation and transverse of said direction of adjustment of said support means, between an idle position in which said concave guide portion is spaced from said head assembly sufficiently to permit said tape to assume an uncupped condition, and an operating position in which said tape is guided in cupped condition along said circular path of said head means; and second adjusting means including adjustable stop means arranged on said base for predetermining said operating position of said tape guiding means, said stop means being arranged and constructed to engage said tape guide means only in said operating position of the latter and to be disengaged therefrom in said idle position, whereby through the combined effect of said first and second adjusting means said concave guide portion is adjustable to be concentric with said axis of rotation when said tape guide means are in operating position.

4. In a recorder for magnetically recording video signals on a magnetizable tape, in combination, a base having a reference surface; an electromagnetic head assembly comprising a rotary wheel member and a plurality of electromagnetic head means mounted on said wheel member at uniform radial distance from the axis of rotation of said wheel member; support means for rotatably supporting said wheel member, said support means being mounted on said base movably in a direction of adjustment substantially perpendicular to said reference surface and to said axis of rotation; first adjusting means for adjusting the position of said support means and thereby the distance of said axis of rotation from said reference surface; tape guiding means for guiding the magnetizable tape in cupped condition along a portion of the circular path of said head means and in a direction transverse of the plane of rotation thereof, said tape guiding means having a concave arcuate guide portion for guiding the tape in said cupped condition and being mounted on said base for being slidable along said base without changing its orientation in a direction transverse of said axis of rotation and transverse of said direction of adjustment of said support means, between an idle position in which said concave guide portion is spaced from said head assembly sufficiently to permit said tape to assume an uncupped condition, and an operating position in which said tape is guided in cupped condition along said circular path of said head means; and second adjusting means including adjustable stop means arranged on said base for predetermining said operating position of said tape guiding means, whereby through the combined effect of said first and second adjusting means said concave guide portion is adjustable to be concentric with said axis of rotation when said tape guide means are in operating position.

5. An arrangement as claimed in claim 4, wherein said tape guiding means including a guide member located at that end of said concave arcuate guide portion which is remote from the other end thereof in the direction of rotation of said wheel member, said guide member being adapted to guide one edge of the tape while the latter is moved in cupped condition past said concave guide portion.

6. An arrangement as claimed in claim 5, including lift means for lifting said one edge of said tape to a position in which it engages said guide member, and control means operatively connected with said tape guiding means for causing said lift means to lift said tape edge when the latter approaches said guide member.

7. In a recorder for magnetically recording video signals on a magnetizable tape, in combination, a base having a reference surface; an electromagnetic head assembly comprising a rotary wheel member and a plurality of electromagnetic head means mounted on said wheel member at uniform radial distance from the axis of rotation of said wheel member; support means for rotatably supporting said wheel member, said support means being mounted on said base movably in a direction of adjustment substantially perpendicular to said reference surface and to said axis of rotation; first adjusting means for adjusting the position of said support means and thereby the distance of said axis of rotation from said reference surface; tape guiding means for guiding the magnetizable tape in cupped condition along a portion of the circular path of said head means and in a direction transverse of the plane of rotation thereof, said tape guiding means having a concave arcuate guide portion for guiding the tape in said cupped condition including suction means for maintaining said cupped condition, said tape guiding means being mounted on said base for being slidable along said base without changing its orientation in a direction transverse of said axis of rotation and transverse of said direction of adjustment of said support means, between an idle position in which said concave guide portion is spaced from said head assembly sufficiently to permit said tape to assume an uncupped condition, and an operating position in which said tape is guided in cupped condition along said circular path of said head means, said suction means including at least one suction channel extending between the surface of said concave guide portion and a surface of said tape guiding means sliding on said base, said base being provided with a first opening registering at one end thereof with one end of said channel when said tape guide means is in said operating position, said first opening being adapted to be connected at the other end thereof to a source of suction so as to apply suction to said channel when said tape guide means is in said operating position, and a second opening registering at one end thereof with said end of said channel when said tape guide means is in said idle position, and communicating at the other end with the atmosphere so as to release any negative pressure existing in said suction means; and second adjusting means including adjustable stop means arranged on said base for predetermining said operating position of said tape guiding means, whereby through the combined effect of said first and second adjusting means said concave guide portion is adjustable to be concentric with said axis of rotation when said tape guide means are in operating position.

8. In a recorder for magnetically recording video signals on a magnetizable tape, in combination, a base having a reference surface; an electromagnetic head assembly comprising a rotary wheel member and a plurality of electromagnetic head means mounted on said wheel member at uniform radial distance from the axis of rotation of said wheel member; support means for rotatably supporting said wheel member, said support means being mounted on said base movably in a direction of adjustment substantially perpendicular to said reference surface and to said axis of rotation; first adjusting means for adjusting the position of said support means and thereby the distance of said axis of rotation from said reference surface; tape guiding means for guiding the magnetizable tape in cupped condition along a portion of the circular path of said head means and in a direction transverse of the plane of rotation thereof, said tape guiding means comprising main guiding means having a concave arcuate guide portion for guiding the tape in said cupped condition and being mounted on said base for being slidable along said base without changing its orientation in a direction transverse of said axis of rotation and transverse of said direction of adjustment of said support means, between an idle position in which said concave guide portion is spaced from head assembly sufficiently to permit said tape to assume an uncupped condition, and an operating position in which said tape is guided in cupped condition along said circular path of said head means, and auxiliary guiding means for changing said tape from uncupped condition to cupped condition, said auxiliary guiding means having a convex arcuate guide portion of a radius substantially equal to that of said concave guide portion and being supported on said base movably between an idle position in which said convex guide portion extends inside the circular path of said head means, and an operative position in which said convex guide portion extends outside said circular path, and control means for moving said auxiliary guiding means to said idle position when said main guiding means are either in said idle or in said operating position thereof, and for moving said auxiliary guiding means to its operative position shortly before said main guiding means reaches its operating position; and second adjusting means including adjustable stop means arranged on said base for predetermining said operating position of said main guiding means, whereby through the combined effect of said first and second adjusting means said concave guide portion is adjustable to be concentric with said axis of rotation when said main tape guide means are in operating position.

9. An arrangement as claimed in claim 8, wherein said control means comprise motion transmitting means including a moving member mounted on said main guiding means and a movable member mounted on said auxiliary guiding means and controlled by said moving member.

References Cited

UNITED STATES PATENTS

| | | | |
|---|---|---|---|
| 2,778,634 | 1/1957 | Gams et al. | |
| 2,968,692 | 1/1961 | Ginsburg et al. | 179—100.2 X |
| 3,020,359 | 2/1962 | Pfost | 179—100.2 |

BERNARD KONICK, *Primary Examiner.*

L. G. KURLAND, J. R. GOUDEAU, *Assistant Examiners.*